(12) United States Patent
Watson et al.

(10) Patent No.: US 10,768,952 B1
(45) Date of Patent: Sep. 8, 2020

(54) SYSTEMS AND METHODS FOR GENERATING INTERFACES BASED ON USER PROFICIENCY

(71) Applicant: Capital One Services, LLC, McLean, VA (US)

(72) Inventors: Mark Watson, Sedona, AZ (US); Kenneth Taylor, Champaign, IL (US); Fardin Abdi Taghi Abad, Champaign, IL (US); Vincent Pham, Champaign, IL (US); Anh Truong, Champaign, IL (US); Jeremy Goodsitt, Champaign, IL (US); Reza Farivar, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/538,507

(22) Filed: Aug. 12, 2019

(51) Int. Cl.
| | |
|---|---|
| *H04L 29/08* | (2006.01) |
| *G06F 9/451* | (2018.01) |
| *G06F 16/958* | (2019.01) |
| *G06F 16/901* | (2019.01) |
| *G06F 11/34* | (2006.01) |
| *G06F 11/30* | (2006.01) |
| *G06F 40/154* | (2020.01) |
| *H04L 29/06* | (2006.01) |

(52) U.S. Cl.
CPC ............ *G06F 9/451* (2018.02); *G06F 11/302* (2013.01); *G06F 11/3438* (2013.01); *G06F 16/901* (2019.01); *G06F 16/972* (2019.01); *G06F 40/154* (2020.01); *H04L 67/22* (2013.01); *H04L 67/42* (2013.01)

(58) Field of Classification Search
CPC ...................................................... H04L 67/22
See application file for complete search history.

(56) References Cited

U.S. PATENT DOCUMENTS

| | | | |
|---|---|---|---|
| 5,115,501 A * | 5/1992 | Kerr | ............... G06F 9/453 |
| 5,602,982 A | 2/1997 | Judd et al. | |
| 6,023,714 A * | 2/2000 | Hill | ................ G06F 40/103 |
| | | | 715/235 |
| 6,380,924 B1 | 4/2002 | Yee et al. | |
| 6,829,646 B1 * | 12/2004 | Philyaw | ................. G06F 3/14 |
| | | | 709/228 |
| 6,981,246 B2 | 12/2005 | Dunn | |

(Continued)

FOREIGN PATENT DOCUMENTS

| | | |
|---|---|---|
| EP | 3059673 A1 | 8/2016 |
| WO | 2015167564 A3 | 11/2015 |
| WO | 2016176062 A1 | 11/2016 |

OTHER PUBLICATIONS

Lara Mossier and Jayanth Prathipati, "Exploring Frameworks for Accessibility Testing within Native Mobile Apps", CSUN Assistive Technology Conference (Mar. 14, 2019), 24 pages.

*Primary Examiner* — Dino Kujundzic
(74) *Attorney, Agent, or Firm* — Hunton Andrews Kurth LLP

(57) ABSTRACT

Embodiments of systems and methods for generating user interfaces are described. In an embodiment, a monitoring tool can observe the user's interaction with a computing device, collect input and output operation data, and calculate a user effectiveness score based on the collected data. A user interface can be generated based on the user effectiveness score to match the user's proficiency.

16 Claims, 13 Drawing Sheets

Method (400)

(56) References Cited

U.S. PATENT DOCUMENTS

| | | |
|---|---|---|
| 7,739,282 B1 | 6/2010 | Smith et al. |
| 7,793,262 B2 | 9/2010 | Atkin et al. |
| 7,840,948 B2 | 11/2010 | Chace |
| 7,849,115 B2 | 12/2010 | Reiner |
| 8,209,758 B1 | 6/2012 | Doukhvalov et al. |
| 8,335,994 B2 * | 12/2012 | So .................... H04L 63/20 |
| | | 715/788 |
| 8,370,811 B2 | 2/2013 | Grechanik et al. |
| 8,412,683 B2 | 4/2013 | Baird et al. |
| 8,667,468 B2 | 3/2014 | Breeds et al. |
| 8,813,028 B2 | 8/2014 | Farooqi |
| 8,924,938 B2 | 12/2014 | Chang et al. |
| 9,122,560 B2 | 9/2015 | Huang et al. |
| 9,123,030 B2 | 9/2015 | Liang et al. |
| 9,141,518 B2 | 9/2015 | Bharadwaj et al. |
| 9,317,259 B2 | 4/2016 | Chandrasekharan et al. |
| 9,432,314 B2 | 8/2016 | Thomas et al. |
| 9,449,524 B2 * | 9/2016 | Bruce .................... G06F 9/453 |
| 9,495,281 B2 | 11/2016 | Peisachov |
| 9,513,763 B1 * | 12/2016 | Adams .................... G06F 8/38 |
| 9,535,718 B2 | 1/2017 | Dewar et al. |
| 9,535,823 B2 | 1/2017 | Peretz et al. |
| 9,563,327 B1 | 2/2017 | Pham |
| 9,569,587 B2 | 2/2017 | Ansari et al. |
| 9,729,403 B1 * | 8/2017 | Rabe .................... G06F 3/04895 |
| 9,886,246 B2 | 2/2018 | Chenny et al. |
| 9,959,112 B2 | 5/2018 | Edmonds et al. |
| 10,445,304 B1 * | 10/2019 | Thompson ............ H04L 67/306 |
| 2002/0093529 A1 * | 7/2002 | Daoud ................ G06F 16/9535 |
| | | 715/745 |
| 2003/0090515 A1 * | 5/2003 | Chang ................ H04N 5/4401 |
| | | 715/745 |
| 2005/0132333 A1 | 6/2005 | Neumann et al. |
| 2006/0277250 A1 | 12/2006 | Cherry et al. |
| 2007/0118804 A1 * | 5/2007 | Raciborski ............ G06F 3/0482 |
| | | 715/745 |
| 2008/0201242 A1 * | 8/2008 | Minnis ................ G06Q 30/0201 |
| | | 705/14.53 |
| 2008/0271058 A1 | 10/2008 | Sathish |
| 2009/0049388 A1 | 2/2009 | Taib et al. |
| 2010/0154216 A1 | 6/2010 | Hulen |
| 2010/0225473 A1 | 9/2010 | Leuthardt et al. |
| 2011/0041177 A1 | 2/2011 | Pereira |
| 2011/0154216 A1 | 6/2011 | Aritsuka et al. |
| 2011/0197116 A1 | 8/2011 | Kim et al. |
| 2012/0060110 A1 | 3/2012 | Virmani et al. |
| 2012/0079276 A1 * | 3/2012 | Evans .............. H04N 21/25435 |
| | | 713/170 |
| 2012/0102164 A1 | 4/2012 | Gruen et al. |
| 2012/0102165 A1 | 4/2012 | Gruen et al. |
| 2012/0117389 A1 | 5/2012 | Sarmenta |
| 2012/0117456 A1 | 5/2012 | Koskimies |
| 2012/0304081 A1 | 11/2012 | Mandic et al. |
| 2013/0007633 A1 | 1/2013 | Cohen et al. |
| 2013/0085843 A1 | 4/2013 | Dyor et al. |
| 2013/0085847 A1 | 4/2013 | Dyor et al. |
| 2013/0086056 A1 | 4/2013 | Dyor et al. |
| 2013/0110992 A1 | 5/2013 | Ravindra et al. |
| 2013/0117105 A1 | 5/2013 | Dyor et al. |
| 2013/0117111 A1 | 5/2013 | Dyor et al. |
| 2013/0117130 A1 | 5/2013 | Dyor et al. |
| 2013/0243208 A1 | 9/2013 | Fawer |
| 2014/0028729 A1 | 1/2014 | Abdukalykov et al. |
| 2014/0052433 A1 | 2/2014 | Prasad et al. |
| 2014/0089824 A1 * | 3/2014 | George .................... G06F 8/38 |
| | | 715/762 |
| 2014/0181751 A1 | 6/2014 | Won et al. |
| 2014/0237425 A1 | 8/2014 | Chan et al. |
| 2014/0317171 A1 | 10/2014 | Fox et al. |
| 2014/0317744 A1 | 10/2014 | Turgeman et al. |
| 2015/0140974 A1 | 5/2015 | Liimatainen |
| 2015/0363046 A1 | 12/2015 | Peterson et al. |
| 2016/0062579 A1 * | 3/2016 | Lee .................... G06F 9/453 |
| | | 715/708 |
| 2016/0180399 A1 * | 6/2016 | Lindo ................ G06Q 30/0269 |
| | | 705/14.66 |
| 2016/0188695 A1 | 6/2016 | Lee et al. |
| 2016/0234624 A1 | 8/2016 | Riva et al. |
| 2016/0259669 A1 | 9/2016 | Jain et al. |
| 2016/0283055 A1 | 9/2016 | Haghighat et al. |
| 2016/0291807 A1 * | 10/2016 | Chong .................... G06Q 30/08 |
| 2016/0328219 A1 | 11/2016 | Kureshy et al. |
| 2017/0052659 A1 | 2/2017 | Ivanov et al. |
| 2017/0083591 A1 | 3/2017 | Francis |
| 2017/0091077 A1 | 3/2017 | Manion et al. |
| 2017/0097742 A1 | 4/2017 | Kim et al. |
| 2017/0097956 A1 | 4/2017 | Kim et al. |
| 2017/0262264 A1 | 9/2017 | Ganesan et al. |
| 2017/0262293 A1 | 9/2017 | Krishnamurthi |
| 2018/0067752 A1 | 3/2018 | Balboni et al. |
| 2018/0067753 A1 | 3/2018 | Balboni et al. |
| 2018/0159982 A1 | 6/2018 | Konig et al. |
| 2018/0197428 A1 | 7/2018 | Baphna et al. |
| 2019/0034060 A1 * | 1/2019 | Ahmad .................... G06F 16/248 |
| 2019/0179875 A1 * | 6/2019 | Lowery .................... G06F 16/972 |
| 2019/0205513 A1 * | 7/2019 | Priya .................... G06F 21/32 |
| 2019/0349439 A1 * | 11/2019 | Anders .............. G06Q 30/0641 |

* cited by examiner

Method (300)

Method (400)

High Proficiency
User Interface 510

Application
User Interface (500)

Significant Proficiency
User Interface 520

Application
User Interface (500)

Moderate Proficiency
User Interface 530

Application
User Interface (500)

Low Proficiency
User Interface 540

Application
User Interface (500)

Account Management Webpage

Credit Card Account

Account: Visa *1234

Current Balance: $1,500  [Pay]

Statement Balance: $1,200  [Pay]

[Automatic Payments]

Account Analysis

[Historical Spending]

[Spending Projections]

Transaction Log

| | | |
|---|---|---|
| 8/21/18 | Restaurant | $55.00 |
| 8/20/18 | Online Retailer | $20.00 |
| 8/19/18 | Grocery Store | $45.00 |
| 8/19/18 | Gas Station | $30.00 |
| 8/18/18 | Online Retailer | $25.00 |
| 8/18/18 | Restaurant | $40.00 |
| 8/17/18 | Pharmacy | $35.00 |

[View All Transactions]

[Dispute A Transaction]

[Home] [Options] [Help] [Logout]

Significant Proficiency
User Interface 620

Web Browser
User Interface (600)

FIG. 6B

Account Management Webpage

Credit Card Account

Account: Visa *1234

Current Balance: $1,500

[ Pay ]

Statement Balance: $1,200

[ Pay ]

Transaction Log

8/21/18  Restaurant  $55.00

8/20/18  Gas Station  $20.00

8/19/18  Grocery  $45.00

[ View All Transactions ]

[ Dispute A Transaction ]

[ Home ] [ Options ] [ Help ]  [ Logout ]

Moderate Proficiency
User Interface 630

Web Browser
User Interface (600)

FIG. 6C

Account Management Webpage

Credit Card Account

Account: Visa *1234

Current Balance:
$1,500

Statement Balance:
$1,200

[Payment Options]

[View All Transactions]

[Dispute A Transaction]

[Home] [Help] [Logout]

Low Proficiency
User Interface 640

Web Browser
User Interface (600)

FIG. 6D

SYSTEMS AND METHODS FOR GENERATING INTERFACES BASED ON USER PROFICIENCY

FIELD OF THE INVENTION

This disclosure relates to the assessment of computer user proficiency, and more specifically, to systems and methods for generating user interfaces reflective of the observed proficiency.

BACKGROUND

The use of personal computing devices, including smartphones, tablets, desktop computers, and laptop computers, is widespread. Almost all consumers use a computing device for business, educational, entertainment, or other purposes, often for a combination of purposes on a daily basis.

The use of personal computing devices is driven in part by the proliferation of personal computing devices, and as these devices become more prevalent, consumers frequently carry one or more of them at all times. The ready availability of these devices creates demand for access to services, such as account management, bill payment, gaming, and video streaming, and online shopping and other services, at home, outside the home, and on mobile devices. Consumers today can interact with personal computing devices on a variety of screen types and sizes, using a variety of input tools.

As the use of personal computing devices, and the uses for these devices, continues to expand, accessibility also grows in importance. In order to utilize personal computing devices for any purposes, consumers must be able to engage with those devices. Consumers that are unable to do so may miss out on a myriad of personal and professional opportunities.

Accordingly, there is a need to make personal computing devices accessible to consumers and promote consumer engagement with personal computing devices in an efficient and effective manner.

SUMMARY

Therefore it is an object of this disclosure to describe systems and methods that generate interfaces that match a user's skill level. Various embodiments describe systems and methods that monitor user activity to determine proficiency and to generate user interfaces in accordance with the measured proficiency.

Embodiments of the present disclosure provide a system for displaying a user interface, comprising: a server hosting a webpage, the webpage having a user interface; a user database storing a user effectiveness index for a user; a client device containing a display and a processor, the client device configured to present a user interface on the display and to receive input from a user through one or more input devices, and the processor configured to execute a monitoring program; wherein, upon execution, the monitoring program configured to: track the operation of each of the one or more input devices and capture input operation data for each input device, the input operation data for each input device having one or more of a positive effect and a negative effect, calculate a user effectiveness index based on the one or more positive effect and negative effect, and transmit the user effectiveness index to the server; and wherein, upon receipt of the user effectiveness index, the server is configured to: store the user effectiveness index in the profile for the user in the user database, and adapt the user interface of the webpage in response to the user effectiveness index.

Embodiments of the present disclosure provide a method for displaying a user interface, comprising: tracking the operation of one or more input devices to collect input operation data as the input devices interact with the user interface, the input devices operated by a user and operably connected to a client device; calculating a user effectiveness index for the user, the user effectiveness index calculated by the summation of one or more positive effects from the input operation data for each input device and one or more negative effects from the input operation data for each input device; transmitting the user effectiveness index to a server; and taking an effectiveness action to adapt the user interface in response to the user effectiveness index, wherein the effectiveness action includes at least one of increasing the spacing around one or more elements of the user interface, increasing the size of one or more fonts displayed on the user interface, and removing one or more elements of the user interface from the user's view.

Embodiments of the present disclosure provide an application for displaying a user interface, the application configured to: display a user interface on a client device; monitor the use of one or more input devices on a client device and capture input operation data relating to the user of each input device; analyze the input operation data to identify positive effects and negative effects and assign a numerical value to each identified positive and negative effect; calculate a user effectiveness index by the summation of values for positive effects and negative effects; and adapting an element of the user interface based on the user effectiveness index, wherein: the element includes at least one of a window, a button, an icon, a menu, a tab, a scroll bar, a zoom tool, a dialog box, a check box, and a radio button, and the adapting includes at least one of adding or removing an element from the user interface, increasing or decreasing the size of an element, increasing or decreasing the size of a font displayed in the element, and increasing or decreasing a time period for the completion of an action involving the element.

BRIEF DESCRIPTION OF THE DRAWINGS

FIGS. 6A-6D illustrate a series of web browser user interfaces according to example embodiments.

DETAILED DESCRIPTION OF EXAMPLE EMBODIMENTS

Computing device users have a range of proficiencies, ranging from skilled users to novice users. User proficiency can be caused by a variety of factors, including without limitation computing experience, familiarity with technology, accessibility needs, physical limitations (e.g., limited vision or imprecise motor skills), and cognitive limitations. One aspect of the present disclosure is to provide systems and methods to determine user proficiency and provide user interfaces appropriate for a user's proficiency. By doing so, embodiments of the present disclosure can support the user's access and effective utilization of the interface.

Figure 1:
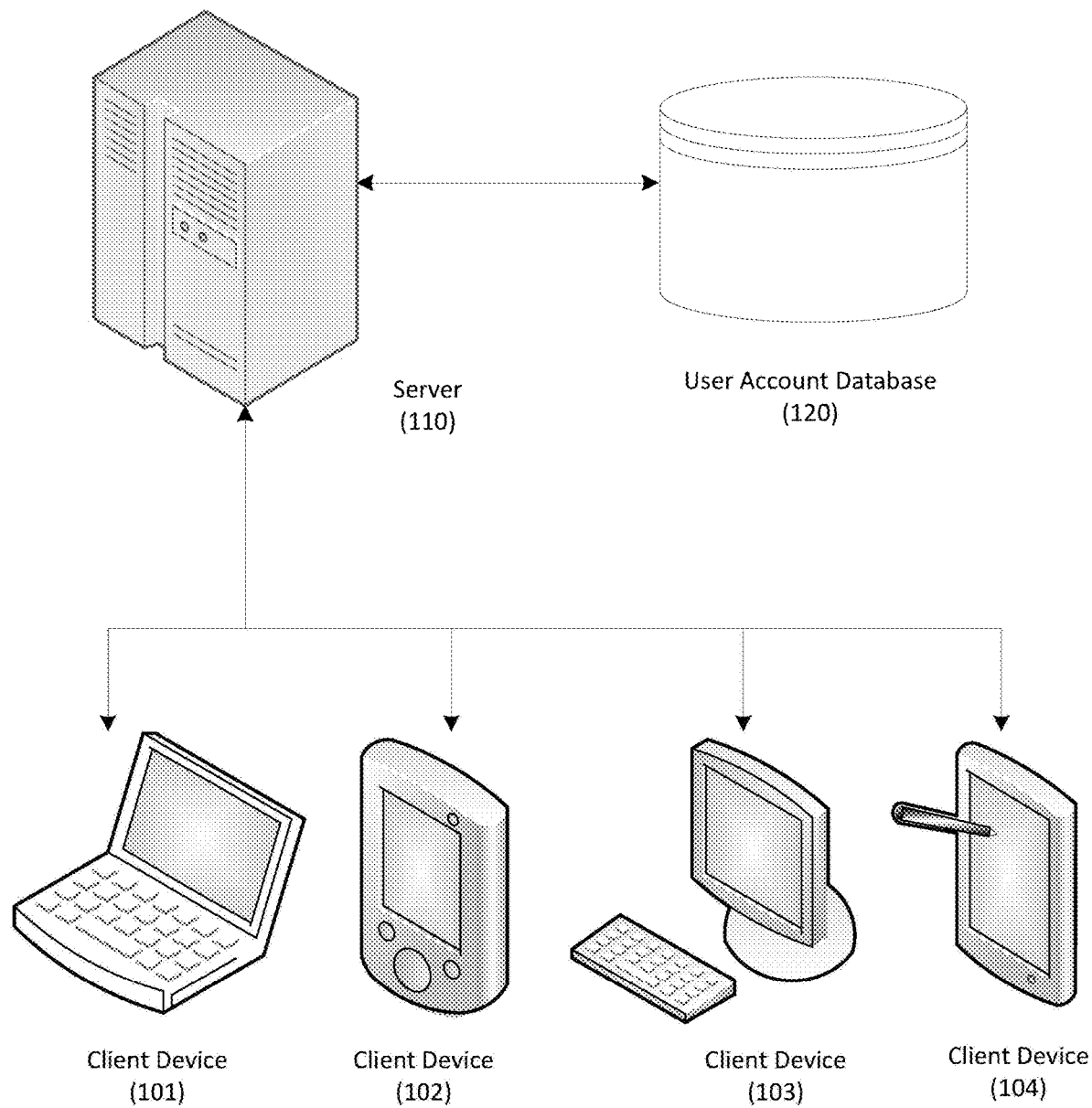
FIG. 1 illustrates an interface generation system according to an example embodiment.

FIG. 1 illustrates an interface generation system 100 according to an example embodiment. In this embodiment, the system includes a plurality of client devices 101, 102, 103, 104, a server 110, and a user profile database 120. As shown in FIG. 1, client device 101 may be a smartphone, client device 102 may be a laptop, client device 103 may be a desktop computer, and client device 104 may be a tablet computer. Client devices 101-104 are not limited to these examples, and may be any combination of smartphones, laptop computers, desktop computers, tablet computers, personal digital assistants, thin clients, fat clients, Internet browsers, or customized software applications. It is further understood that the client devices may be of any type of device that supports the communication and display of data and user input. While the example embodiment illustrated in FIG. 1 shows client devices 101-104, the present disclosure is not limited to a specific number of client devices, and it is understood that the system 100 may include a single client device or multiple client devices.

The server 110 can be a dedicated server computer, such as bladed servers, or may be personal computers, laptop computers, notebook computers, palm top computers, network computers, mobile devices, or any processor-controlled device capable of supporting the system 100. While FIG. 1 illustrates a single server 110, it is understood that other embodiments may use multiple servers or multiple computer systems as necessary or desired to support the users and may also use back-up or redundant servers to prevent network downtime in the event of a failure of a particular server.

The server 110 can contain a user account database 120. The user account database 120 can be a relational or non-relational database, or a combination of more than one database. In an embodiment, the user account database 120 can be stored by server 110, alternatively the user account database 120 can be stored remotely, such as in another server, on a cloud-based platform, or in any storage device that is in data communication with server 110. In an embodiment, the user account database can store account information for accounts associated with users (e.g., transaction history, available services, and available content).

In an embodiment, the user account database 120 can further include a user profile for each user associated with an account. The user profile can include identification for a user (e.g., full name, login credentials required for accessing restricted information or restricted interfaces) and contact information (e.g., mailing address, telephone number, email address). The user profile can further include a user effectiveness index. The user effectiveness index can be a numerical value, and can indicate the proficiency with which a user can interact with a computing device. For example, the user effectiveness index can range from 0.0 for a low proficiency user to 1.0 for a high proficiency user. This range is only exemplary, and it is understood that embodiments of the present disclosure provide for a range of any numerical values.

Figure 2A:
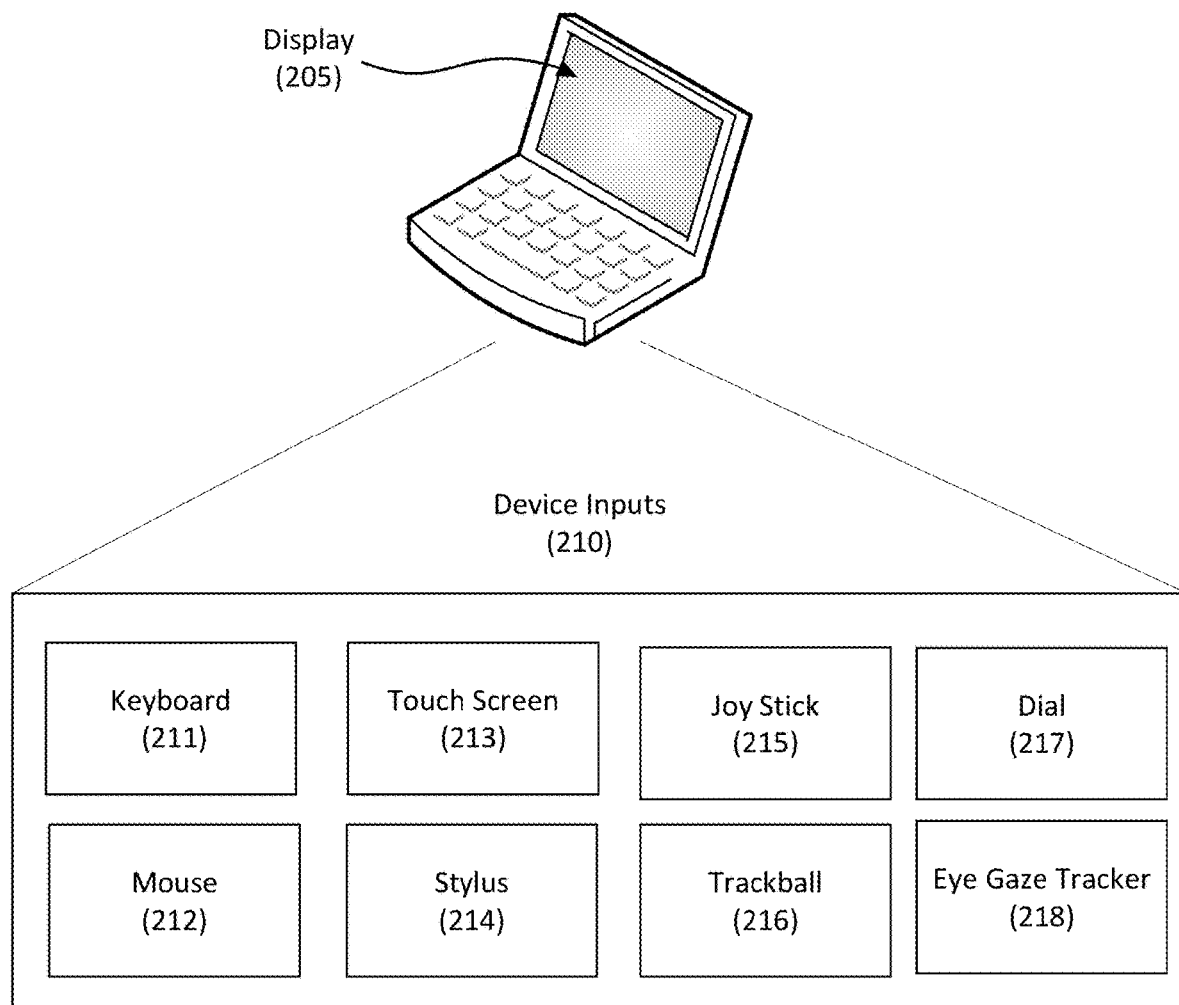
FIGS. 2A and 2B illustrate a client device according to an example embodiment.
Figure 2B:
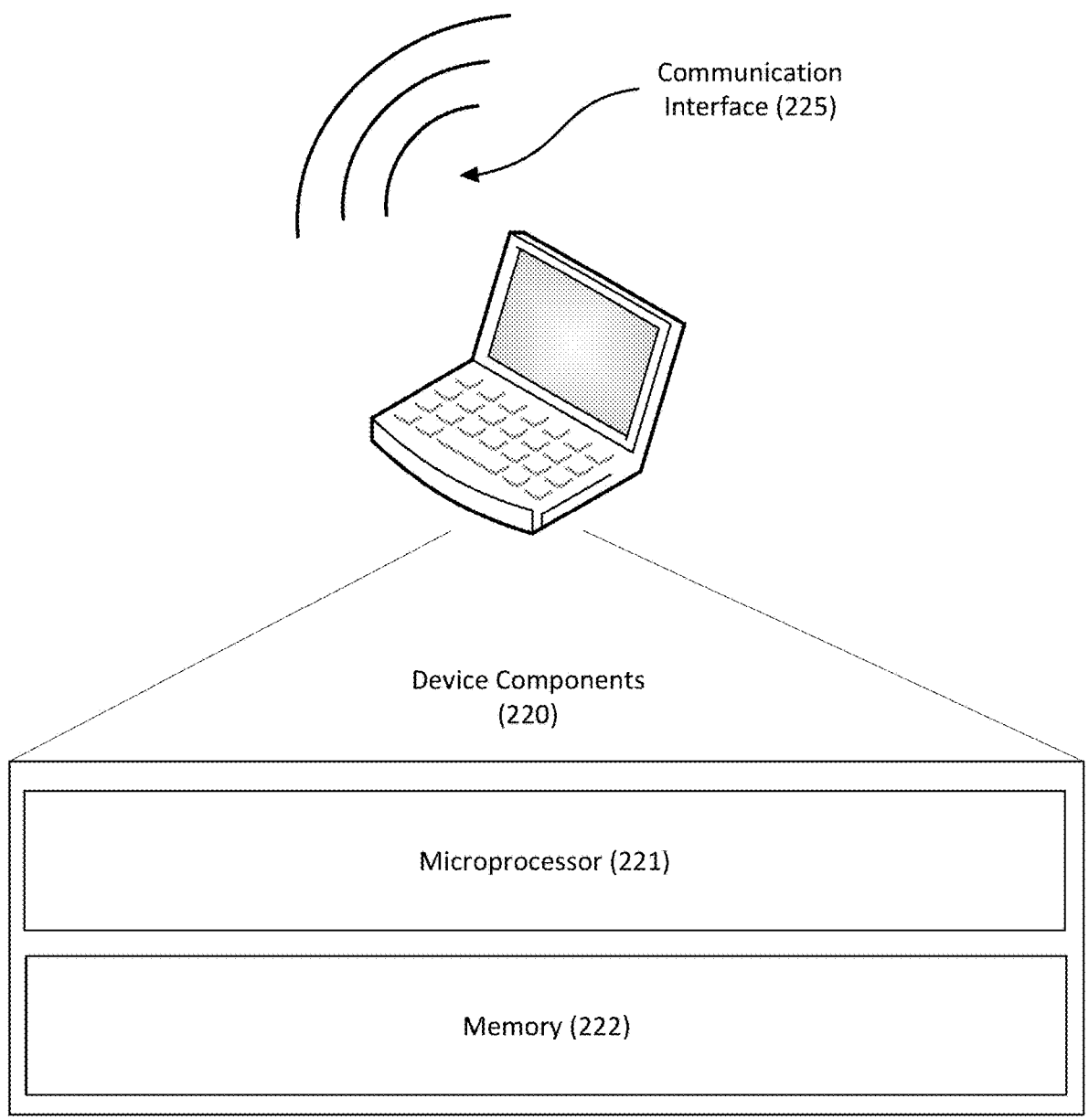

FIGS. 2A and 2B illustrate a client device 200 according to an example embodiment. Client device 200 is depicted as a laptop computer in FIGS. 2A and 2B, but it is understood that client device 200 can be any of the client devices described above with reference to FIG. 1.

As shown in FIG. 2A, client device 200 can include a display 205 and device inputs 210. The display 205 can be any type of device for presenting visual information such as a computer monitor, a flat panel display, and a mobile device screen, including liquid crystal displays, light-emitting diode displays, plasma panels, and cathode ray tube displays.

The device inputs 210 can include any device for entering information into the client devices that is supported by the client device 200, including without limitation one or more of a keyboard 211, a mouse 212, a touch screen 213, a stylus 214, a joystick 215, a trackball 216, a dial 217, and an eye gaze tracker 218. In addition, while not illustrated in FIG. 2A, the device inputs can further include, without limitation, one or more of a joypad, a pointing stick, a touch pad, a three-dimensional mouse, a light pen, a dial, a knob, a gesture recognition input device, a sip-and-puff input device, a microphone, a digital camera, a video recorder, and a camcorder. These devices may be used to enter information and interact with the client device 200 and by extension with the systems described herein.

As shown in FIG. 2B, the client device 200 can include device components 220 and a communication interface 225. The device components 220 can include a microprocessor 221. The microprocessor 221 can include a processor and associated processing circuitry, and can contain additional components, including processors, memories, error and parity/CRC checkers, data encoders, anticollision algorithms, controllers, command decoders, security primitives and tamperproofing hardware, as necessary to perform the functions described herein.

The memory 222 can be a read-only memory, write-once read-multiple memory or read/write memory, e.g., RAM, ROM and EEPROM, and the client device 200 can include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The communication interface 225 can include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client device 200 can also support a short-range wireless communication interface, such as near field communication, radio-frequency identification, and Bluetooth, through communication interface 225, along with radio transmissions.

In an embodiment, a monitoring tool can be utilized to track the user's interaction with the client device 200. In an embodiment, the monitoring tool can be stored in the memory 220 and executed by the processor 221. Alternatively, the monitoring tool can be stored remotely, such as by the server 110. It is understood that the monitoring tool can be stored on, or read from, other types of computer program products or computer-readable media, such as secondary storage devices, including hard disks, floppy disks, CD- ROM, or other forms of RAM or ROM. The computer-readable media may include instructions for controlling the systems and for performing the methods described herein. For example, the monitoring tool can be a script executed in connection with a webpage or application installed on a client device, a separately executable file installed on the client device, or other form of application.

In an embodiment, the monitoring tool can detect the user's interaction with the client device 200. The monitoring tool can track the use of one or more of the device inputs 210, and can observe the user's frequency and manner of usage, and collect this information as input device data. Exemplary tracked usage characteristics can include, without limitation, input device movement, movement speed, click accuracy, typing speed, typing accuracy, selection accuracy, navigation path, scrolling, and zooming. This collected data can be referred to as input operation data. The monitoring tool can assess the input operation data and assign positive or negative effects of differing magnitudes to actions taken by the users.

For example, the monitoring tool can identify instances of direct movement, rapid movement, a successful button click, a successful button click on the first attempt, rapid typing, a successful selection on the first attempt, a direct navigation path, instances where keyboard shortcuts are used, absence of instances where the backspace key is pressed, absence of instances where the delete key is pressed, and absence of instances where the back button is clicked. In an embodiment, instances of these actions can be classified as positive effects, which can be indicative of a more proficient user.

In an embodiment, one or more scrolling actions can be classified as positive effects. For example, a successful scroll up or scroll down action, e.g., scrolling up or down to display additional information, scrolling up or down to display additional information without backtracking, scrolling up or down to display additional information without attempting to scroll past the top or bottom of the display, and smoothly scrolling up or down, can be indicative of a more proficient user.

In an embodiment, one or more zooming actions can be classified as positive effects. For example, a successful zoom in or zoom out, e.g., zooming in or out within the limits set on the display, zooming in or out without attempting to bypass the maximum or minimum zoom set for the page, zooming in or out without backtracking, and smoothly zooming in or out, can be indicative of a more proficient user.

As another example, the monitoring tool can identify instances of indirect movement, slow movement, an unsuccessful button click, an unsuccessful button click on the first attempt, slow typing, an unsuccessful selection on the first attempt, an indirect navigation path, absence of instances where keyboard shortcuts are used, instances where the backspace key is pressed, and instances where the delete key is pressed. In an embodiment, instances of these actions can be classified as negative effects, which can be indicative of a less proficient user.

In an embodiment, one or more scrolling actions can be classified as negative effects. For example, a unsuccessful scroll up or scroll down action, e.g., scrolling up or down to when there is not additional information to display, scrolling up or down to display additional information and backtracking, scrolling up or down to display additional information and attempting to scroll past the top or bottom of the display, and scrolling up or down in an unsmooth motion, can be indicative of a less proficient user.

In an embodiment, one or more zooming actions can be classified as negative effects. For example, an unsuccessful zoom in or zoom out, e.g., zooming in or out outside of the limits set on the display, zooming in or out and attempting to bypass the maximum or minimum zoom set for the page, zooming in or out and then backtracking, and zooming in or out in an unsmooth manner, can be indicative of a less proficient user.

In an embodiment, the monitoring tool can detect information relating to the user's interaction with the display of information on the client device. For example, this information can include, without limitation, the size of the display on the client device, the resolution used on the display, and the font size used. This collected data can be referred to as output operation data. As with the input operation data, the monitoring tool can assess the output operation data and assign positive or negative effects of differing magnitudes to actions taken by the users.

For example, the monitoring tool can identify instances of a small display size, a high display resolution, and a small font size. In an embodiment, instances of these output operation data can be classified as positive effects, which can be indicative of a more proficient user.

For example, the monitoring tool can identify instances of a large display size, a low display resolution, and a large font size. In an embodiment, instances of these output operation data can be classified as negative effects, which can be indicative of a less proficient user.

In an embodiment, the monitoring tool can assign a value to each identified instance of positive and negative effects in the input operation data and the output operation data. The assigned values can vary by the type of effect identified, and as well as by the frequency and magnitude of the effect. For example, the positive effects can be assigned a positive value, and the negative effects can be assigned as negative value. The monitoring tool can calculation a user effectiveness score through the summation of values assigned to all identified positive and negative effects, or to a subset of identified effects. In an embodiment, the assigned values and the user effectiveness score, can be normalized.

Tables 1 to 4 below provides exemplary effect identifications and user effectiveness scores. For example, Table 1 demonstrates the calculation of a user effectiveness score of within a range of 0.0 to 1.0. As shown below, this calculation identifies a plurality of positive effects and results in a user effectiveness score of 0.9, indicating a highly proficient user.

TABLE 1

| Identified Effect | Assigned Value |
| --- | --- |
| Direct mouse movement | 0.1 |
| Successful button click | 0.05 |
| Successful first attempt button click | 0.1 |
| Keyboard shortcut | 0.2 |
| Absence of backspace key | 0.1 |
| Direct mouse movement | 0.1 |
| Successful button click | 0.05 |
| Successful first attempt button click | 0.1 |
| High display resolution | 0.1 |
| User effectiveness score | 0.9 |

As another example, Table 2 demonstrates the calculation of a user effectiveness score of within a range of 0.0 to 1.0. As shown below, this calculation identifies a plurality of positive effects and results in a user effectiveness score of 0.6, indicating a significantly proficient user.

TABLE 2

| Identified Effect | Assigned Value |
| --- | --- |
| Direct mouse movement | 0.1 |
| Successful button click | 0.05 |
| Unsuccessful first attempt button click | −0.1 |
| Use of backspace key | −0.1 |
| Keyboard shortcut | 0.2 |
| Absence of delete key | 0.1 |
| Direct mouse movement | 0.1 |
| Successful button click | 0.05 |
| Successful first attempt button click | 0.1 |
| Indirect navigation path | −0.1 |
| High display resolution | 0.1 |
| Large display size | 0.1 |
| User effectiveness score | 0.6 |

As another example, Table 3 demonstrates the calculation of a user effectiveness score of within a range of 0.0 to 1.0. As shown below, this calculation identifies a plurality of positive effects and results in a user effectiveness score of 0.4, indicating a moderately proficient user.

TABLE 3

| Identified Effect | Assigned Value |
| --- | --- |
| Direct mouse movement | 0.1 |
| Successful button click | 0.05 |
| Unsuccessful first attempt button click | −0.1 |
| Use of backspace key | −0.1 |
| Absence of delete key | 0.1 |
| Direct mouse movement | 0.1 |
| Successful button click | 0.05 |
| Successful first attempt button click | 0.1 |
| Direct navigation path | 0.1 |
| Keyboard shortcut | 0.2 |
| Low display resolution | −0.1 |
| Small display size | −0.1 |
| User effectiveness score | 0.4 |

As another example, Table 4 demonstrates the calculation of a user effectiveness score of within a range of 0.0 to 1.0. As shown below, this calculation identifies a plurality of positive effects and results in a user effectiveness score of 0.1, indicating a low proficiency user.

TABLE 4

| Identified Effect | Assigned Value |
| --- | --- |
| Indirect mouse movement | −0.1 |
| Direct mouse movement | 0.1 |
| Successful button click | 0.05 |
| Unsuccessful first attempt button click | −0.1 |
| Use of backspace key | −0.1 |
| Direct mouse movement | 0.1 |
| Successful button click | 0.05 |
| Successful first attempt button click | 0.1 |
| Direct navigation path | 0.1 |
| Absence of delete key | 0.1 |
| Low display resolution | −0.1 |
| Small display size | −0.1 |
| User effectiveness score | 0.1 |

It is understood that the identifications of positive and negative effects, the values assigned to those effects, the relative values assigned to those effects, and the user effectiveness score shown in Tables 1 to 4 are exemplary. Embodiments of the present disclosure can include any combination of positive and negative effects, any combination of frequency and magnitude, any value assignment, and any user effectiveness scores.

In an embodiment, the input operation data and output operation data can be stored locally in the memory of the client device, or at an external location. The monitoring tool can be configured to collect operation data up to a predetermined limit or can perform a continuous collection on a rolling basis up so as to maintain a buffer of the most recent operation data.

Figure 3:
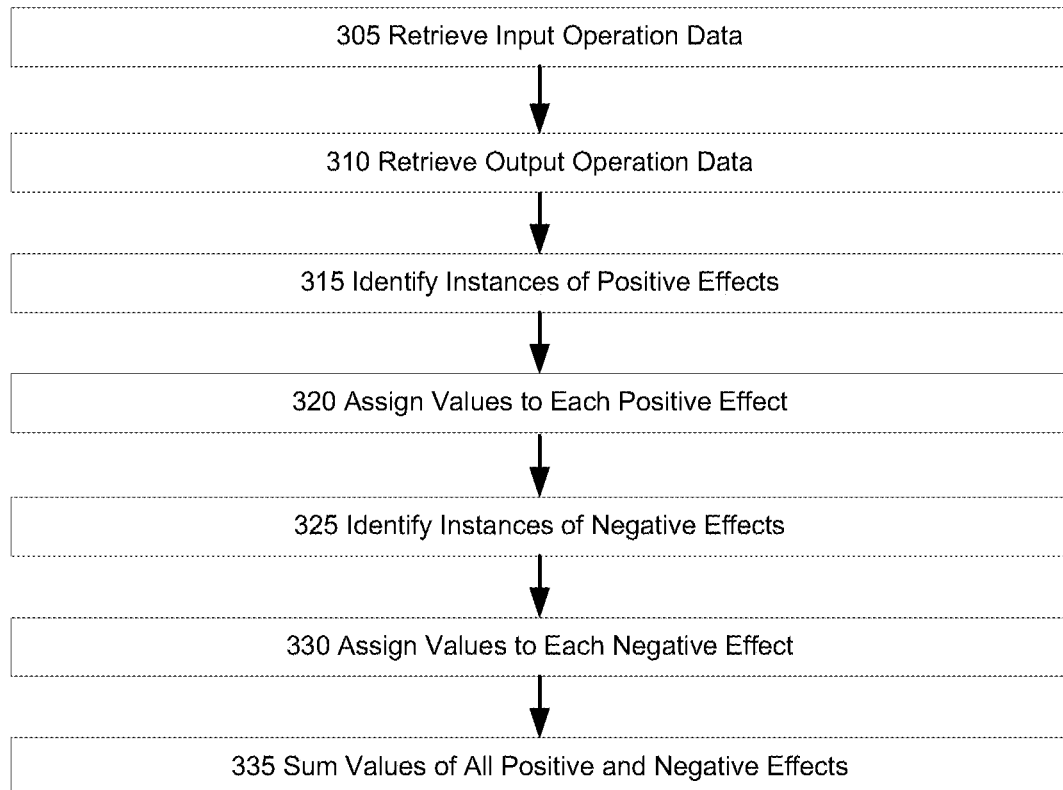
FIG. 3 illustrates a flow chart for a method of calculating a user effectiveness score according to an example embodiment.

FIG. 3 illustrates a method of calculating a user effectiveness score according to an example embodiment. As shown in FIG. 3, the method 300 commences in step 305 and step 310 with the retrieval of input operation data and output operation data. Once this data is retrieved, the monitoring tool can review the data to identify instances of positive and negative effects. More specifically, in step 315, the monitoring tool can identify instances of positive effects, and in step 320, the monitoring tool can assign values to each positive effect. Similarly, in step 325, the monitoring tool can identify instances of negative effects, and in step 330, the monitoring tool can assign values to each negative effect.

Once the positive and negative effects are identified and assigned values, the method can proceed to step 335 where the monitoring tool can add the values of all positive effects and all negative effects. The value of this summation can be the user effectiveness score. In an embodiment, the values assigned to all positive and negative effects can be normalized, or the summation value can be normalized, as appropriate to fit the user effectiveness score into an expected range.

In an embodiment, the steps of method 300 can be performed continuously, e.g., positive and negative effects can be identified and assigned values at the same time. Alternatively, the steps of method 300 can be performed discretely, e.g., in the sequential order illustrated in FIG. 3.

In an embodiment, the monitoring tool can calculate a user effectiveness score once sufficient input and output operation data is collected, and the monitoring tool can continuously updated the user effectiveness score as additional input and output operation data is collected. Alternatively, the monitoring tool can calculate a user effectiveness score once sufficient input and output data has been collected and then cease further data collection and user effectiveness score calculation. In either case, once calculated, the user effectiveness score can be used as a gauge to assess the proficiency of the user and to generate a user interface in accordance with the user's proficiency.

In an embodiment, the user effectiveness score can be stored in a user profile, a user information database, an account information database, or other collection of user information. The collected input and output operation data can also be stored in this manner, however, in an embodiment the collected operation data can be deleted and only the user effectiveness score can be retained, in order to protect user privacy.

Figure 4:
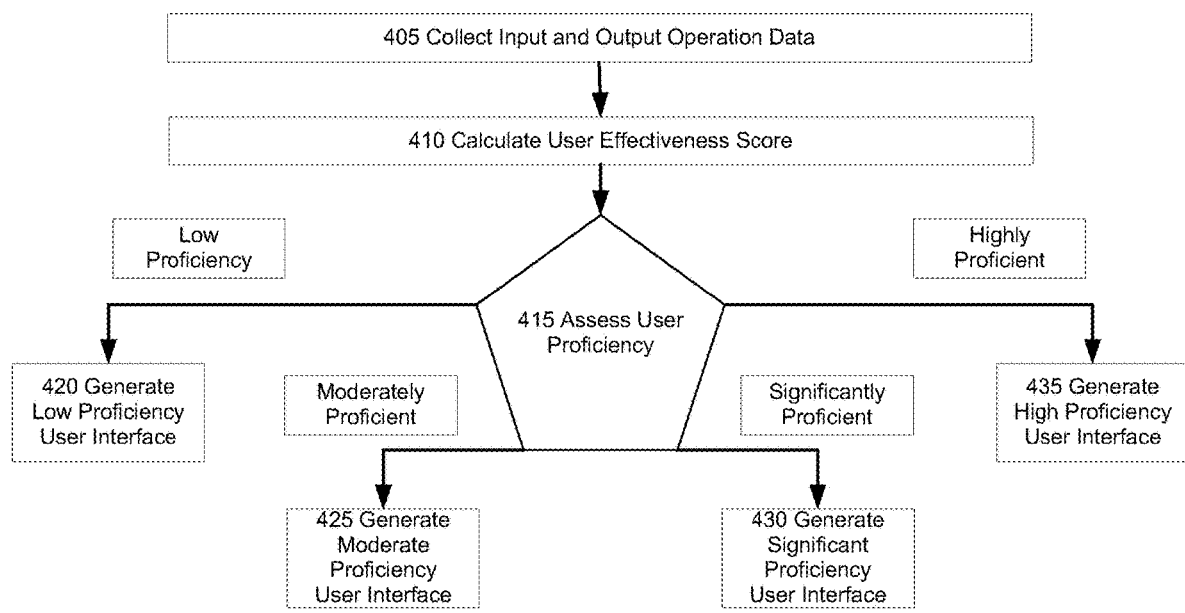
FIG. 4 illustrates a flow chart for a method of generating a user interface according to an example embodiment.

FIG. 4 illustrates a method of generating a user interface according to an example embodiment. The method 400 can commence with step 405, where the monitoring tool can collect input operation data and output operation data. The operation data collection process can continue indefinitely, can continue indefinitely while maintaining a fixed-size data buffer on a rolling basis, or can halt upon collection of sufficient operation data to calculate a user effectiveness score. In any case, following operation data collection, the method 400 can proceed to step 410 where the monitoring tool can calculate the user effectiveness score. This calculation can be performed as illustrated in FIG. 3.

Upon completion of step 410, the method 400 can advance to step 415 where the user effectiveness score can be utilized to assess the proficiency of the user. This assessment can invoke ranges within the universe of user effectiveness scores (e.g., thirds or quartiles), set thresholds for user effectiveness scores, or employ other means of categorizing a given score. In the examples presented in Tables 1 to 4, a user effectiveness score range of 0.0 to 1.0 was provided, a 0.9 score placed in the top 10% and indicated a highly proficiency user, a 0.6 score placed within the top 50% and indicated a significantly proficient user, a 0.4 score placed in the lower 50% and indicated a moderately proficient user, and a 0.1 score placed in the bottom 10% and indicated a low proficiency user.

Depending upon the assessment performed in step 415, the method 400 can proceed to any of steps 420, 425, 430, or 435 for the generation of the user interface. If the monitoring tool determines the user effectiveness score indicates that the user has a low proficiency during step 415, the method 400 can proceed to step 420 where a low proficiency user interface can be generated. If the monitoring tool determines the user effectiveness score indicates that the user has moderate proficiency during step 415, the method 400 can proceed to step 425 where a moderate proficiency user interface can be generated. If the monitoring tool determines the user effectiveness score indicates that the user has significant proficiency during step 415, the method 400 can proceed to step 430 where a significant proficiency user interface can be generated. If the monitoring tool determines the user effectiveness score indicates that the user has a high proficiency during step 415, the method 400 can proceed to step 435 where a high proficiency user interface can be generated.

In an embodiment, the generation of the user interface can be performed by the monitoring tool, or by the server, the user's client device or application, or other program, such that the appropriate interface is delivered for display on the user's client device. It is understood that while some embodiments discussed herein can be implemented in certain ways (e.g., a server adjusting cascading style sheets), the present disclosure is not limited to a specific implementation for generation or delivery of user interfaces.

A user interface can be generated or adjusted for users of varying proficiencies based on a user effectiveness score through a variety of effectiveness actions. Exemplary effectiveness actions include, without limitation, increasing or decreasing the cell padding, element spacing (e.g., the spacing between widgets, windows, buttons, icons, menus, tabs, scroll bars, zooming tools, dialog boxes, check boxes, radio buttons, text or other displayed information or graphical elements), and font size, changing formatting (e.g., bolding, underlining, and italicizing text, highlighting text or interface elements), and adding or hiding elements from the user's view. Elements present on the user interface can also be simplified (e.g., by reducing the information displayed, the options presented, or distributing the same over a series of interfaces) or made more complex (by increasing the amount of information and options presented and reducing the number of interfaces required to complete a task). As another example, elements of a user interface can be rearranged to increase or decrease spacing and to adjust navigation path complexity.

FIGS. 5A to 5D illustrate a series of application user interfaces generated for varying user effectiveness scores according to example embodiments. The application user interface 500 shown in these figures may be displayed on a smartphone, tablet computer, laptop computer, desktop computer, or any other client device where a credit management application has been installed or can be deployed. In an embodiment, the application user interface 500 may be adapted to a mobile client device, including a smart phone and a tablet computer. In another embodiment, the application user interface 500 may be adapted to a client device with more system resources, including a laptop computer or desktop computer.

Figure 5A:
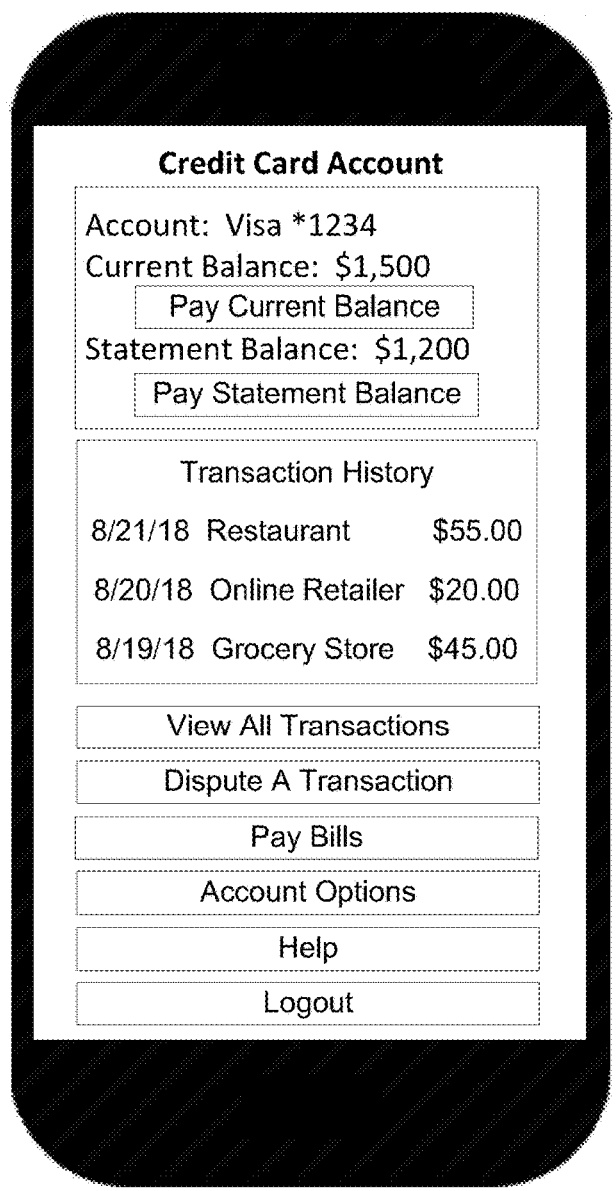
FIGS. 5A-5D illustrate a series of application user interfaces according to example embodiments.

As shown in FIG. 5A, the application user interface 500 can display a high proficiency user interface 510 for a financial account. This interface can include a plurality of elements and display a broad range of information. These elements can be presented with compact spacing, small font sizes, and multiple widgets and interaction options. For example, information regarding current account balances can be presented alongside payment options. A transaction history can be shown, and the user can be presented options for viewing additional transactions or disputing a transaction. A series of other choices, including bill pay, account management options, a help resource, and a logout button, can also be presented. In an embodiment, the high proficiency user interface 510 can be presented to a user having a user effectiveness score that indicates a high level of proficiency.

Figure 5B:
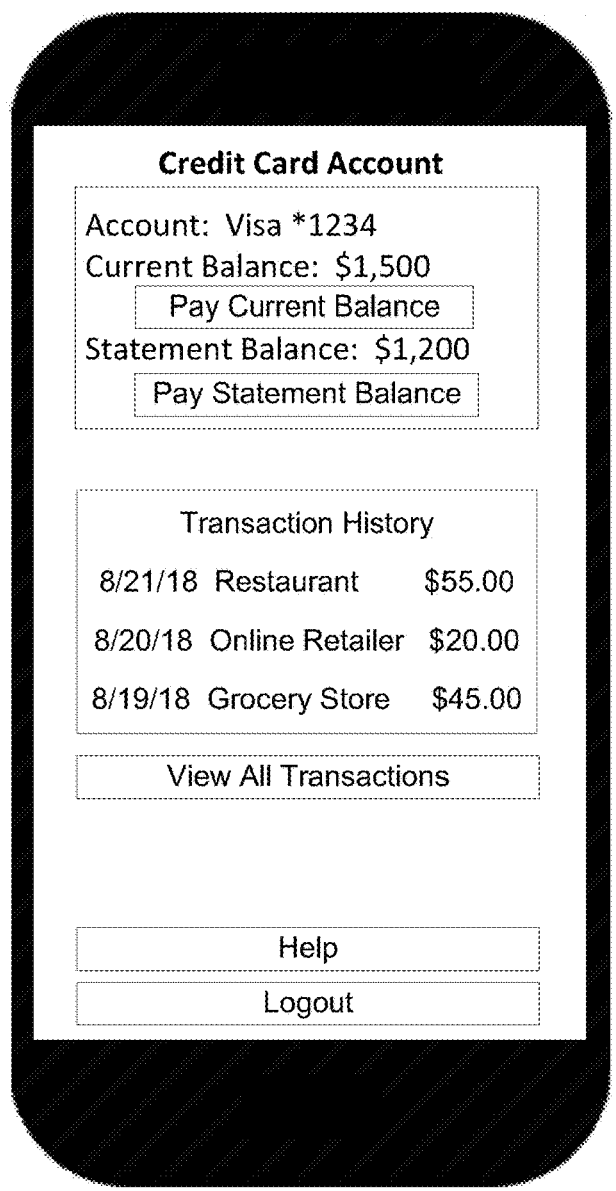

FIG. 5B shows an application user interface 500 that can display a significant proficiency user interface 520 for a financial account. This interface can be presented to a user having a user effectiveness score that indicates a significant level of proficiency. In contrast to the high proficiency user interface 510, the significant proficiency user interface 520 can display fewer elements and less information, with larger font sizes and increased spacing between elements. Elements and information not displayed can be made available on other interfaces.

Figure 5C:
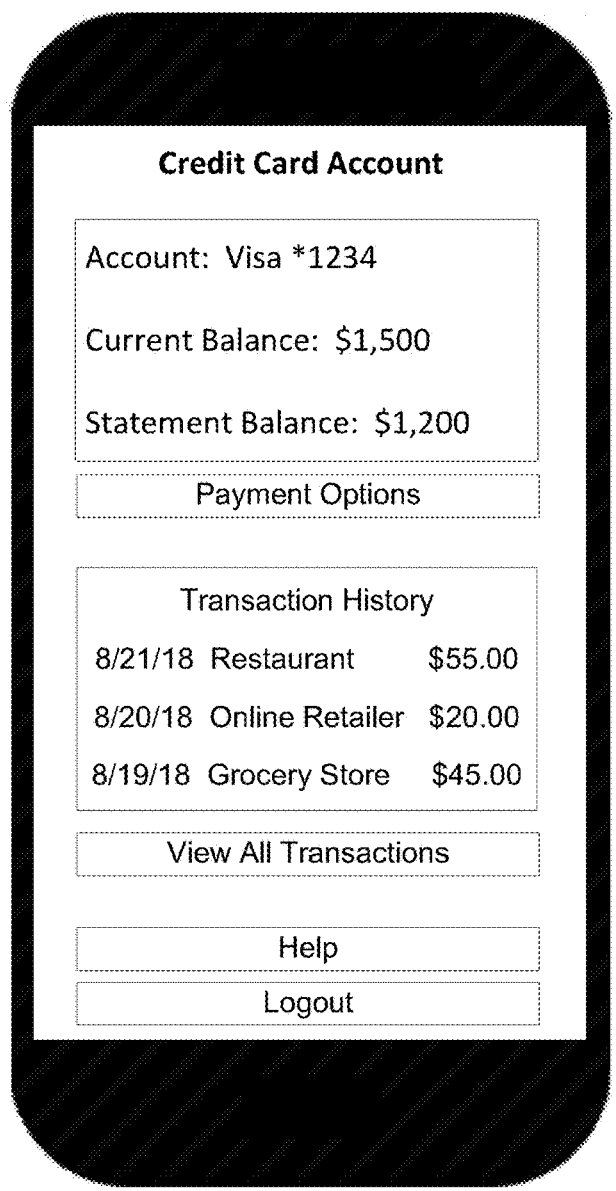

FIG. 5C shows an application interface 500 that can display a moderate proficiency user interface 530 for a financial account. This interface can be presented to a user having a user effectiveness score that indicates a moderate level of proficiency. The moderate proficiency user interface 530 can further reduce the elements and information displayed, increase spacing and font sizes, can display fewer elements and less information, and can use larger font sizes and increased spacing between elements. Elements and information not displayed can be made available on other interfaces.

Figure 5D:
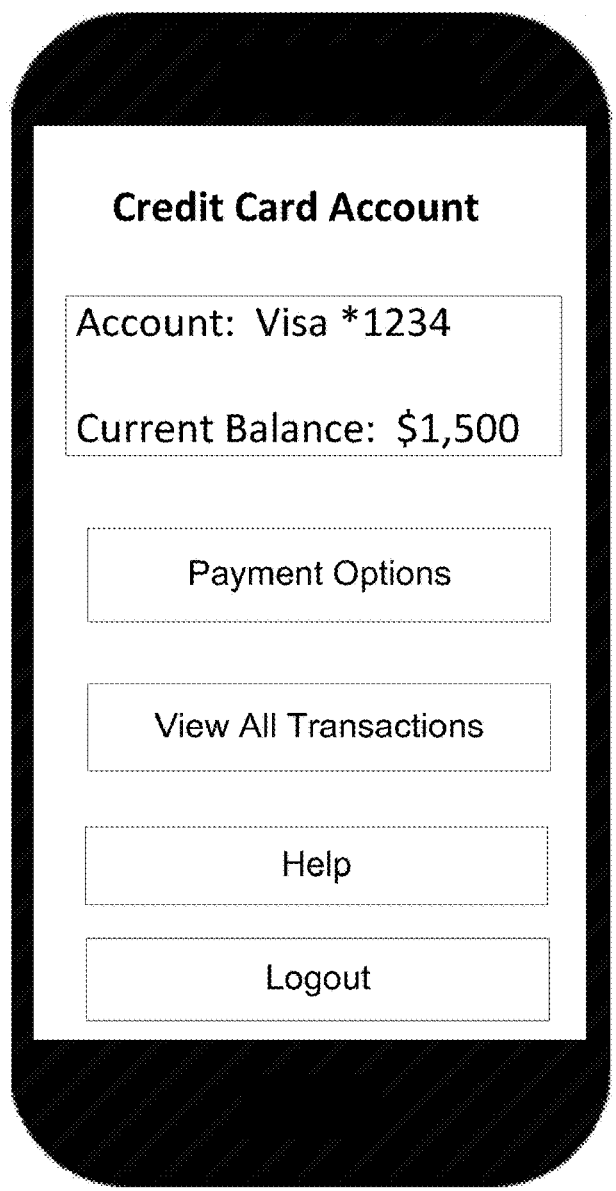

FIG. 5D shows an application interface 500 that can display a low proficiency user interface 540 for a financial account. This interface can be presented to a user having a user effectiveness score that indicates a low level of proficiency. As shown in FIG. 5D, the low proficiency user interface 540 can present a small amount of information using large font sizes. The interface can present the user with several options in the form of large buttons, each of which can lead the user to other interfaces focused on a particular task.

FIGS. 6A to 6D illustrate a series of web browser user interfaces generated for varying user effectiveness scores according to example embodiments. The web browser user interface 600 shown in these figures may be displayed on a smartphone, tablet computer, laptop computer, desktop computer, or any other client device where a web browser has been installed. In an embodiment, the web browser user interface 600 may be adapted to a mobile client device, including a smart phone and a tablet computer. In another embodiment, the web browser user interface 600 may be adapted to a client device with more system resources, including a laptop computer or desktop computer.

Figure 6A:
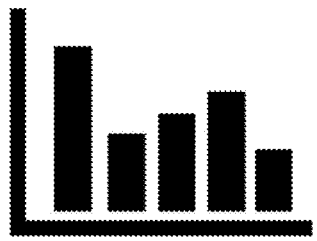

As shown in FIG. 6A, the web browser user interface 600 can display a high proficiency user interface 610 for a financial account. This interface can include a plurality of elements and display a broad range of information. These elements can be presented with compact spacing, small font sizes, and multiple widgets and interaction options. For example, information regarding current account balances can be presented alongside payment options, and an analytical tool for assessing past expenditures and projecting future spending can be presented. Further, a transaction history can be shown, and the user can be presented options for viewing additional transactions or disputing a transaction. A series of other choices, including automatic payments, account management options, a help resource, and a logout button, can also be presented. In an embodiment, the high proficiency user interface 610 can be presented to a user having a user effectiveness score that indicates a high level of proficiency.

FIG. 6B shows a web browser user interface 600 that can display a significant proficiency user interface 620 for a financial account. This interface can be presented to a user having a user effectiveness score that indicates a significant level of proficiency. The significant proficiency user interface 620 can display fewer elements and less information, with larger font sizes and increased spacing between elements, when compared to the high proficiency user interface 610. Elements and information not displayed can be made available on other interfaces.

FIG. 6C shows a web browser user interface 600 that can display a moderate proficiency user interface 630 for a financial account. This interface can be presented to a user having a user effectiveness score that indicates a moderate level of proficiency. The moderate proficiency user interface 630 can further reduce the elements and information displayed, increase spacing and font sizes, can display fewer elements and less information, and can use larger font sizes and increased spacing between elements. Elements and information not displayed can be made available on other interfaces.

FIG. 6D shows an application interface 600 that can display a low proficiency user interface 640 for a financial account. This interface can be presented to a user having a user effectiveness score that indicates a low level of proficiency. As shown in FIG. 6D, the low proficiency user interface 640 can present a small amount of information using large font sizes. The interface can present the user with several options in the form of large buttons, each of which can lead the user to other interfaces focused on a particular task.

Embodiments of the present disclosure are not limited to a certain type of user interface, or user interfaces for a certain type of account or service. It is understood that the present disclosure includes, without limitation, user interfaces or applications used for financial purposes (e.g., savings, checking, credit card, debit card, mortgage, loan, brokerage, retirement, cryptocurrency accounts), services (e.g., utilities and home security accounts), entertainment (e.g., news, sports, video streaming, and gaming), hosting content (e.g., data backups, music and video content, and digital archives), and others.

Further, it is understood that, while certain exemplary embodiments illustrate four categories of user proficiency (high, significant, moderate, and low), the present disclosure is not limited thereto. A user effectiveness score can be interpreted in a variety of ways, including without limitation using thresholds, a sliding scale, categories, or a combination thereof.

As described herein, the ability of users to engage with and effectively interact with a user interfaces is critical for both businesses and consumers. Failure to provide users with appropriate interfaces can have a significant negative impact on a consumer's quality of life and on the operation and success of a business. Embodiments of the present disclosure provide systems and methods for generating user interfaces that reduce negative impacts, and improve user access, efficiency, and engagement with software applications.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A system for displaying a user interface, comprising:
   a server hosting a webpage, the webpage having the user interface;
   a user database storing a user effectiveness index for a user;
   a monitoring program comprising instructions for execution on a client device containing a display, a processor, and one or more input devices;
   wherein, upon execution, the monitoring program is configured to:
      track the operation of each of the one or more input devices and capture input operation data for each input device, the input operation data having one or more selected from the group of at least one input positive effect and at least one input negative effect,
      track the operation of the display to capture output operation data of the display, wherein the output operation includes at least one selected from the group of display size, display resolution, and font size, and the output operation data having one or more selected from the group of at least one output positive effect and at least one output negative effect, wherein an output positive effect includes at least one selected from the group of a small display size, a high display resolution, and a small font size and an output negative effect includes at least one selected from the group of a large display size, a low display resolution, and a large font size;
      calculate a user effectiveness index based on one or more selected from the group of the at least one input positive effect, the at least one input negative effect, the at least one output positive effect, and the at least one output negative effect, wherein the monitoring program increments the user effectiveness index based on each input positive effect and each output positive effect and decrements the user effectiveness index based on each input negative effect and each output negative effect, and
      transmit the user effectiveness index to the server; and
   wherein, upon receipt of the user effectiveness index, the server is configured to:
      store the user effectiveness index in the profile for the user in the user database, and adapt the user interface of the webpage in response to the user effectiveness index.

2. The system for displaying a user interface of claim 1, wherein:

the one or more input devices include at least one selected from the group of a keyboard, a mouse, a trackball, a touch screen, a joystick, a joypad, a pointing stick, a touch pad, a three-dimensional mouse, a light pen, a stylus, a dial, a knob, an eye gaze tracker, a gesture recognition input device, and a sip-and-puff input device; and the input operation data includes at least one selected from the group of movement, movement speed, click accuracy, typing speed, typing accuracy, selection accuracy, navigation path, scrolling actions, and zooming actions.

3. The system of displaying a user interface of claim 2, wherein the at least one input positive effect includes at least one selected from the group of direct movement, rapid movement, a successful button click, a successful button click on a first attempt, rapid typing, a successful selection on a first attempt, a direct navigation path, a successful scroll action, a successful zoom action, instances where keyboard shortcuts are used, absence of instances where a backspace key is pressed, absence of instances where a delete key is pressed, and absence of instances where a back button is clicked.

4. The system of displaying a user interface of claim 2, wherein the at least one input negative effect includes at least one selected from the group of indirect movement, slow movement, an unsuccessful button click, an unsuccessful button click on a first attempt, slow typing, an unsuccessful selection on a first attempt, an indirect navigation path, an unsuccessful scroll action, an unsuccessful zoom action, absence of instances where keyboard shortcuts are used, instances where a backspace key is pressed, and instances where a delete key is pressed.

5. The system of displaying a user interface of claim 1, wherein the server adapts the user interface of the webpage by applying a style sheet designed for a user having a low user effectiveness index, the style sheet performing at least one selected from the group of increasing at least one selected from the group of the cell padding, element spacing, and font size of the webpage, hiding at least one element of the webpage from the user's view, and bolding, italicizing, and/or underlining text.

6. The system of displaying a user interface of claim 1, wherein the server adapts the user interface of the webpage by generating a second webpage, the second webpage having a second user interface configured for a user having for a low user effectiveness index, the second user interface presenting at least one less element of the webpage to the user and/or increasing at least one selected from the group of the cell padding, element spacing, and font size of the webpage.

7. The system of displaying a user interface of claim 1, wherein:

the user database stores login credentials that, upon submission to the server, allow access to restricted information; and the monitoring program tracks the operation of each of the one or more input devices and captures input operation data for each input device prior to the receipt of login credentials by the server.

8. A method for displaying a user interface, comprising:
tracking the operation of one or more input devices to collect input operation data as the input devices interact with the user interface, the input operation data for each input device having one or more selected from the group of at least one input positive effect and at least one input negative effect;

tracking the operation of the display to capture output operation data of the display, wherein the output operation data includes at least one selected from the group of display size, display resolution, and font size, and the output operation data having one or more selected from the group of at least one output positive effect and at least one output negative effect, wherein an output positive effect includes at least one selected from the group of a small display size, a high display resolution, and a small font size and an output negative effect includes at least one selected from the group of a large display size, a low display resolution, and a large font size;

calculating a user effectiveness index, the user effectiveness index calculated by the summation of at least one selected from the group of the at least one input positive effect, the at least one input negative effect, the at least one output positive effect, and the at least one output negative effect;

transmitting the user effectiveness index to a server; and taking an effectiveness action to adapt the user interface in response to the user effectiveness index, wherein the effectiveness action includes at least one selected from the group of increasing the spacing around one or more elements of the user interface, increasing the size of one or more fonts displayed on the user interface, removing one or more elements of the user interface, and removing bolding, italicizing, and/or underlining from text.

9. The method for displaying a user interface of claim 8, wherein the one or more elements include at least one selected from the group of a window, a button, an icon, a menu, a tab, a scroll bar, a zoom tool, a dialog box, a check box, and a radio button.

10. The method for displaying a user interface of claim 8, further comprising monitoring the input operation data for at least one selected from the group of movement, movement speed, click accuracy, typing speed, typing accuracy, selection accuracy, navigation path, scrolling action, and zooming action.

11. The method for displaying a user interface of claim 10, further comprising:

categorizing at least one selected from the group of direct movement, rapid movement, a successful button click, a successful button click on a first attempt, rapid typing, a successful selection on a first attempt, a direct navigation path, a successful scroll action, a successful zoom action, absence of instances where a backspace key is pressed, absence of instances where a delete key is pressed, and absence of instances where a back button is clicked in the input operation data as one or more input positive effects;

categorizing at least one selected from the group of indirect movement, slow movement, an unsuccessful button click, an unsuccessful button click on a first attempt, slow typing, an unsuccessful selection on the a attempt, an indirect navigation path, an unsuccessful scroll action, an unsuccessful zoom action, instances where a backspace key is pressed, and instances where a delete key is pressed in the input operation data as one or more input negative positive effects; and assigning a numerical value to each of the one or more input positive effects and each of the one or more input negative effects.

12. The method for displaying a user interface of claim 11, wherein the numerical value is determined based on the magnitude of each of the one or more input positive effects and each of the one or more input negative effects and the frequency of occurrence of each of the one or more input positive effects and each of the one or more input negative effects.

13. The method for displaying a user interface of claim 12, wherein the value of each of the one or more input positive effects is positive, and the value of each of the one or more input negative effects is negative, and the user effectiveness index is calculated by the summation of all values for the one or more positive effects and all values for the one or more negative effects.

14. The method for displaying a user interface of claim 13, wherein:
   the user effectiveness index is stored in a user database by the server; and
   the user database further includes login credentials, and tracking the operation of one or more input devices begins upon receipt by the server of login credentials.

15. A non-transitory computer-readable medium storing an application for displaying a user interface, the application configured to:
   display the user interface;
   monitor the operation of one or more input devices and capture input operation data relating to the use of each input device, the input operation data having one or more selected from the group of at least one input positive effect and at least one input negative effect;
   monitor the operation of a display and capture output operation data for the display, the output operation data having one or more selected from the group of at least one output positive effect and at least one output negative effect,
   wherein the output operation data includes at least one selected from the group of display size, display resolution, and font size, and the output operation data having one or more selected from the group of at least one output positive effect and at least one output negative effect, wherein an output positive effect includes at least one selected from the group of a small display size, a high display resolution, and a small font size and an output negative effect includes at least one selected from the group of a large display size, a low display resolution, and a large font size;
   analyze the input operation data to identify one or more input positive effects, one or more input negative effects, one or more output positive effects, and one or more output negative effects, and assign a numerical value to each identified input positive effect, input negative effect, output positive effect, and output negative effect;
   calculate a user effectiveness index by the summation of the numerical values for each of the one or more input positive effects, the one or more input negative effects, one or more output positive effects, and one or more output negative effects; and
   adapting an element of the user interface based on the user effectiveness index, wherein:
      the element includes at least one selected from the group of a window, a button, an icon, a menu, a tab, a scroll bar, a zoom tool, a dialog box, a check box, and a radio button, and
      the adapting includes at least one selected from the group of adding or removing an element from the user interface, increasing or decreasing the size of an element, increasing or decreasing the size of a font displayed in the element, increasing or decreasing a time period for the completion of an action involving the element, and bolding, italicizing, and/or underlining text.

16. The non-transitory computer-readable medium storing an application for displaying a user interface of claim 15, wherein the application:
   continuously monitors the one or more input devices and captures input operation data;
   continuously analyzes the input operation data to identify positive input effects and negative input effects and to assign numerical values;
   continuously calculates a user effectiveness index; and
   adapts an element of the user interface based on the user effectiveness index upon each refresh of the displayed user interface.

* * * * *